US012056995B2

(12) United States Patent
Siu (10) Patent No.: US 12,056,995 B2
(45) Date of Patent: Aug. 6, 2024

(54) SECURITY CAMERA SYSTEM WITH MULTI-DIRECTIONAL MOUNT AND METHOD OF OPERATION

(71) Applicant: Johnson Controls Tyco IP Holdings LLP, Milwaukee, WI (US)

(72) Inventor: Patrick Siu, Tyngsborough, MA (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 6 days.

(21) Appl. No.: 17/750,021

(22) Filed: May 20, 2022

(65) Prior Publication Data

US 2022/0277629 A1    Sep. 1, 2022

Related U.S. Application Data

(63) Continuation of application No. 15/638,711, filed on Jun. 30, 2017, now Pat. No. 11,361,640.

(51) Int. Cl.
*H04N 5/247* (2006.01)
*G08B 13/196* (2006.01)
(Continued)

(52) U.S. Cl.
CPC .    *G08B 13/19628* (2013.01); *G08B 13/19632* (2013.01); *H04B 5/72* (2024.01);
(Continued)

(58) Field of Classification Search
CPC ........ G11B 19/20; H04N 5/772; H04N 5/247; H04N 5/23238; H04N 13/0282; H04N 13/0055
See application file for complete search history.

(56) References Cited

U.S. PATENT DOCUMENTS 5,818,519 A    10/1998  Wren
5,878,151 A     3/1999  Tang et al.
(Continued)

FOREIGN PATENT DOCUMENTS

DE    102006004731    8/2007
EP         1594322   11/2005
(Continued)

OTHER PUBLICATIONS

International Preliminary Report on Patentability, mailed on Jan. 9, 2020, from International Application No. PCT/JS2018/039895, filed on Jun. 28, 2018. 10 pages.
(Continued)

*Primary Examiner* — Patrick E Demosky
(74) *Attorney, Agent, or Firm* — ArentFox Schiff LLP (57) ABSTRACT

A security camera system includes a base unit and sensor modules for generating image data. The base unit includes several mounting sockets arranged at different elevational and azimuthal directions around the base unit, and the sensor modules attach, for example, magnetically, to the mounting sockets. Each mounting socket includes a socket ID, which is read by a reader module of the sensor modules and used to stitch together the image data from different sensor modules. The sensor modules are powered wirelessly via induction and communicate wirelessly with the base unit via wireless transceivers and antennas.

18 Claims, 8 Drawing Sheets

(51) Int. Cl.
  *H04B 5/72* (2024.01)
  *H04B 5/77* (2024.01)
  *H04B 5/79* (2024.01)
  *H04N 23/45* (2023.01)
  *H04N 23/58* (2023.01)
  *H04N 23/60* (2023.01)
  *H04N 23/65* (2023.01)

(52) U.S. Cl.
  CPC .............. *H04B 5/77* (2024.01); *H04B 5/79* (2024.01); *H04N 23/45* (2023.01); *H04N 23/58* (2023.01); *H04N 23/60* (2023.01); *H04N 23/65* (2023.01)

(56) References Cited

U.S. PATENT DOCUMENTS

| | | | |
|---|---|---|---|
| 6,002,995 A | 12/1999 | Suzuki et al. | |
| 6,476,856 B1 * | 11/2002 | Zantos | G08B 13/1963 348/E5.026 |
| 6,768,563 B1 | 7/2004 | Murata et al. | |
| 6,799,047 B1 | 9/2004 | Bahl et al. | |
| 6,839,560 B1 | 1/2005 | Bahl et al. | |
| 6,898,432 B1 | 5/2005 | Jiang | |
| 6,947,059 B2 | 9/2005 | Pierce et al. | |
| 7,680,192 B2 | 3/2010 | Kaplinsky | |
| 7,903,871 B2 | 3/2011 | Kaplinsky et al. | |
| 7,922,329 B1 | 4/2011 | Graether | |
| 8,456,513 B2 | 6/2013 | Raynor | |
| 9,227,568 B1 | 1/2016 | Hubbell et al. | |
| 9,430,781 B1 | 8/2016 | Kerr et al. | |
| 9,438,782 B2 | 9/2016 | Donaldson | |
| 9,690,172 B2 | 6/2017 | Donaldson | |
| 9,876,953 B2 | 1/2018 | Bagnato et al. | |
| 9,911,454 B2 | 3/2018 | van Hoff et al. | |
| 10,057,487 B1 | 8/2018 | Chen | |
| 2001/0024233 A1 | 9/2001 | Urisaka et al. | |
| 2001/0056574 A1 | 12/2001 | Richards | |
| 2002/0095486 A1 | 7/2002 | Bahl | |
| 2003/0118015 A1 | 6/2003 | Gunnarsson et al. | |
| 2004/0105005 A1 | 6/2004 | Yamamoto et al. | |
| 2004/0152471 A1 | 8/2004 | MacDonald et al. | |
| 2004/0166878 A1 | 8/2004 | Erskine et al. | |
| 2004/0203482 A1 | 10/2004 | Bacon et al. | |
| 2004/0263609 A1 | 12/2004 | Otsuki et al. | |
| 2005/0128286 A1 | 6/2005 | Richards | |
| 2005/0130677 A1 | 6/2005 | Meunier et al. | |
| 2005/0190972 A1 | 9/2005 | Thomas et al. | |
| 2005/0207487 A1 | 9/2005 | Monroe | |
| 2005/0208952 A1 | 9/2005 | Dietrich et al. | |
| 2006/0014548 A1 | 1/2006 | Bolin et al. | |
| 2006/0017842 A1 | 1/2006 | Jun | |
| 2006/0050149 A1 | 3/2006 | Lang et al. | |
| 2006/0066723 A1 | 3/2006 | Iwase et al. | |
| 2007/0042706 A1 | 2/2007 | Ledeczi et al. | |
| 2007/0109407 A1 | 5/2007 | Thompson | |
| 2007/0185980 A1 | 8/2007 | Abraham et al. | |
| 2007/0188653 A1 | 8/2007 | Pollock et al. | |
| 2007/0241965 A1 | 10/2007 | Kolavennu | |
| 2008/0004888 A1 | 1/2008 | Davis et al. | |
| 2008/0039114 A1 | 2/2008 | Phatak et al. | |
| 2008/0112699 A1 | 5/2008 | Huseth et al. | |
| 2008/0180537 A1 | 7/2008 | Weinberg et al. | |
| 2009/0303329 A1 | 12/2009 | Morisaki | |
| 2010/0079599 A1 | 4/2010 | Kanma | |
| 2010/0225738 A1 | 9/2010 | Webster | |
| 2010/0250369 A1 | 9/2010 | Peterson et al. | |
| 2011/0096166 A1 | 4/2011 | Englander et al. | |
| 2011/0134240 A1 | 6/2011 | Anderson et al. | |
| 2011/0168783 A1 | 7/2011 | Yoder | |
| 2011/0231092 A1 | 9/2011 | Kuo et al. | |
| 2012/0169842 A1 | 7/2012 | Chuang et al. | |
| 2012/0229672 A1 | 9/2012 | Cok et al. | |
| 2012/0242788 A1 | 9/2012 | Chuang et al. | |
| 2013/0099563 A1 * | 4/2013 | Partovi | H02J 50/80 307/104 |
| 2013/0170378 A1 | 7/2013 | Ray et al. | |
| 2014/0135042 A1 | 5/2014 | Buchheim et al. | |
| 2014/0146132 A1 | 5/2014 | Bagnato et al. | |
| 2014/0264047 A1 | 9/2014 | Valentino et al. | |
| 2014/0327733 A1 | 11/2014 | Wagreich | |
| 2014/0327770 A1 | 11/2014 | Wagreich | |
| 2014/0354828 A1 | 12/2014 | Rubinstein et al. | |
| 2015/0103171 A1 | 4/2015 | Cho | |
| 2015/0172518 A1 | 6/2015 | Lucas et al. | |
| 2015/0247912 A1 | 9/2015 | Tang et al. | |
| 2015/0341210 A1 | 11/2015 | Ranbro | |
| 2015/0348580 A1 * | 12/2015 | van Hoff | G06T 1/0007 348/48 |
| 2016/0037085 A1 | 2/2016 | Mills et al. | |
| 2016/0088670 A1 * | 3/2016 | San Vicente | H04L 63/08 455/41.2 |
| 2016/0173737 A1 | 6/2016 | Cho | |
| 2016/0182826 A1 | 6/2016 | Blum et al. | |
| 2016/0357092 A1 | 12/2016 | Donaldson | |
| 2016/0366336 A1 | 12/2016 | Kuehnle et al. | |
| 2017/0052247 A1 | 2/2017 | Kong et al. | |
| 2017/0055131 A1 | 2/2017 | Kong et al. | |
| 2017/0278365 A1 | 9/2017 | Madar et al. | |
| 2018/0018023 A1 | 1/2018 | Nakamura et al. | |
| 2018/0268868 A1 | 9/2018 | Salokannel et al. | |
| 2018/0350100 A1 | 12/2018 | Hanson et al. | |

FOREIGN PATENT DOCUMENTS

| | | |
|---|---|---|
| EP | 2110795 | 10/2009 |
| EP | 2791868 | 6/2017 |
| WO | 2004042667 A1 | 5/2004 |

OTHER PUBLICATIONS

International Preliminary Report on Patentability, mailed on Apr. 9, 2020, from International Application No. PCT/US2018/052901, filed on Sep. 26, 2018. 10 pages.

International Preliminary Report on Patentability, mailed on Apr. 9, 2020, from International Application No. PCT/US2018/052908 filed on Sep. 26, 2018. 8 pages.

Partial Search Report of the International Searching Authority, mailed on Oct. 10, 2018, from International Application No. PCT/US2018/039895, filed on Jun. 28, 2018. 9 pages.

Axis Q3709-PVE Network Camera: data sheet, 2015: Axis Communications AG. Two pages.

Dahua Technology: Multi-Sensor Panoramic Camera DH-IPC-PFW8601N-H-A180: data sheet, earlier than Jun. 8, 2017: www.dahuasecurity.com. Three pages.

Hikvision DS-2CD6986F-(H) Pano-vu Series Panoramic Dome Camera: specification, 2015: Hikvision Digital Technology Co., Ltd. Four pages.

Hikvision DS-2DP1636-D Pano-vu Series 360 degree Panoramic Camera: specification, 2015: Hikvision Digital Technology Co., Ltd. Four pages.

Optera IMM Series with SureVision 2.0 180 degree, 270 degree, 360 degree Panoramic, 12 MPX IP Cameras: specification, earlier than Jun. 8, 2017: Pelco by Schneider Electric. Six pages.

Vivotek S Series MS8391-EV Multiple Sensor Network Camera: data sheet, earlier than Jun. 8, 2017: Vivotek Inc. Three pages.

Vivotek S Series MS8392-EV Multiple-Sensor Dome Network Camera: data sheet, earlier than Jun. 8, 2017: Vivotek Inc. Three pages.

Wisenet PNM-9O20V 7.3 Megapixel Multi-Sensor 180 degree Panoramic Camera: data sheet, earlier than Jun. 8, 2017: Hanwha Techwin Co., Ltd. One page.

International Search Report and Written Opinion of the International Searching Authority, mailed on Dec. 19, 2018, from International Application No. PCT/US2018/052908 filed on Sep. 26, 2018. 14 pages.

International Search Report and Written Opinion of the International Searching Authority, mailed on Dec. 7, 2018, from International Application No. PCT/US2018/039895, filed on Jun. 28, 2018. 17 pages.

(56) References Cited

OTHER PUBLICATIONS

International Search Report and Written Opinion of the International Searching Authority, mailed on Feb. 18, 2019, from International Application No. PCT/US2018/052901, filed on Sep. 26, 2018. 18 pages.
Partial Search Report of the International Searching Authority, mailed on Dec. 18, 2018, from International Application No. PCT/US2018/052901, filed on Sep. 26, 2018. 11 pages.
Afshari, H., et al., "The PANOPTIC Camera: A Plenoptic Sensor with Real-Time Omnidirectional Capability," J. Sign Process Syst., 70: 305-328 (2013).

* cited by examiner

SECURITY CAMERA SYSTEM WITH MULTI-DIRECTIONAL MOUNT AND METHOD OF OPERATION

CROSS REFERENCE TO RELATED APPLICATION

This application is a continuation of U.S. patent application Ser. No. 15/638,711, filed Jun. 30, 2017, entitled "SECURITY CAMERA SYSTEM WITH MULTI-DIRECTIONAL MOUNT AND METHOD OF OPERATION," which is incorporated by reference herein in its entirety.

BACKGROUND OF THE INVENTION

Video surveillance, e.g., security, systems are often deployed in and around buildings as well as in metropolitan settings. Example buildings and metropolitan settings include schools, government buildings, commercial buildings, residential buildings, multi dwelling units, roads and highways, and town and city centers.

These video security systems typically include surveillance, e.g., security, cameras that connect via a security network to a control system. Additional components include network video recorder (NVR) systems and monitors for displaying images such as video from the security cameras.

The security cameras typically have a lenses and imager systems that are fixed, adjustable, or motorized. A fixed security camera will have the lens and imager system permanently fixed in a set position (i.e., lens and imager system cannot change position with respect to camera body). On the other hand, an adjustable security camera's lens and imager system is movable with respect to camera body (e.g., installer can move the lens and imager system to different positions) so that it can be pointed down a hall or at a door, for example. A motorized security camera, such as a pan-tilt-zoom (PTZ) security camera, utilizes motor(s) to automatically move the lens and imager system to different positions usually under operator or automatic control.

Multi-sensor security cameras have also been deployed to capture a wide field of view. A typical multi-sensor security camera comprises two to four sensor modules covering a 180-degree, 270-degree or 360-degree field of view. Each sensor module has a lens and imager system. The sensor modules are positioned or repositioned to cover the panoramic field of view while minimizing or eliminating blind spots. Typically, multi-sensor security cameras are designed either with sensor modules that are fixed in place or with a mechanical positioning system that can tilt the sensor modules up and down or sideways according to the specific mechanical design of the security camera system.

SUMMARY OF THE INVENTION

The problem with mechanical positioning systems in multi-sensor security cameras is that the movement and/or available positions of the sensor modules are limited by design factors such as the size of the mechanical gimbal and the necessity of predefined movement tracks and guides set for each axis. Additionally, the wiring assembly, for carrying power and raw image data, between each sensor module and the image processing unit of the security camera system are bulky and often restrict the allowable range of movement and positions of the sensor modules. As a result, these security camera systems often have blind spots, as their fields of view are limited by their mechanical design.

In these systems, the number and arrangement of sensor modules for 180-, 270- and 360-degree fields of view are also tightly coupled with the mechanical design of the cameras such that significantly different mechanical designs are required for each desired field of view. This results in high design and manufacturing costs and long development cycle times, all of which increase in proportion to the number of sensor modules required for each camera.

The present invention implements a single, universal design for a security camera system with a variable number of sensor modules and possible fields of view including 90-, 180-, 270- and 360-degrees. The security camera system includes a base unit, including a mounting dome, the surface of which includes several, such as 4 to 10 or more mounting sockets to which a variable number of sensor modules are attached mechanically or magnetically. Each mounting socket can have a unique identification (for example, engraved on the surface of the mounting socket), which can be read by the different sensor modules and used, for example, by a network video distribution system, for image stitching and intelligent video analytics. The sensor modules can be powered wirelessly via magnetic induction. Similarly, the sensor modules might communicate with a base unit of the security camera system via low power wireless technology such as Bluetooth Low Energy (BLE), near-field communication (NFC), LiFi, and visible light communication (VLC), among other examples. A resilient, such as rubber, ring attached to the top of each sensor modules provides a cushion between a transparent, protective bubble covering the security camera system and the sensor module, pressure on the rubber ring (resulting from installing the transparent bubble and securing it in place) transfers to the base of the sensor module, preventing movement and/or vibration of the sensor module.

The availability of several mounting sockets on the mounting dome provides practically unlimited arrangements of sensor modules, eliminating the blind spots imposed by previous mechanical designs. The field of view can be further enhanced by the wireless communication and powering between the base unit and sensor modules, which eliminates bulky wire assemblies.

The variable number of sensor modules also allows for a single, universal design, regardless of the desired field of view of the security camera system, significantly reducing the complexity and cost of design, manufacturing and installation, as well as the development cycle time. Base units and sensor modules can be manufactured independently, and the sensor modules themselves can be easily installed, removed or repositioned to different mounting sockets on the mounting dome by simply attaching and detaching them. The association of particular position and location information with the image data captured by each sensor module, by the reading of the mounting socket identification, further simplifies image stitching and video analytics.

In general, according to one aspect, the invention features a security camera system comprising a base unit and sensor modules for capturing image data. The base unit includes a plurality of mounting sockets arranged at different elevational and azimuthal directions around the base unit, and the sensor modules attach to the mounting sockets.

In embodiments, the mounting sockets are arranged on the surface of a hemispherical mounting dome. A protective transparent bubble is secured over the sensor modules and the base unit, and an interior surface of the transparent bubble presses against elastic contact rings of the sensor modules, preventing movement of the sensor modules. The arrangement of mounting sockets provides a potential panoramic field of view of the security camera system of 360 degrees of azimuth and 180 degrees in elevation, with no blind spots. The field of view can be customized by varying how many sensor modules are attached to the base unit and to which mounting sockets the sensor modules are attached. Unique socket identifications can be physically engraved on the surface of or in connection with each mounting socket, and reader modules of the sensor modules detect the socket identifications of the mounting sockets to which the sensor modules are attached. The base unit's controller translates the socket identifications to elevation and azimuth information associated with the mounting sockets to which the sensor modules are attached. A network video distribution system can then receive image data captured by the sensor modules and elevation and azimuth information associated with the mounting sockets to which the sensor modules are attached, and stitch the image data together using the elevation and azimuth information.

In general, according to another aspect, the invention features a method of operation of a security camera system. Sensor modules, attached to a base unit via a plurality of mounting sockets arranged at different elevational and azimuthal directions around the base unit, capture image data, which is then combined based on the elevational and azimuthal directions of the mounting sockets to which the sensor modules are attached.

In general, according to another aspect, the invention features a security camera system comprising a base unit with an inductive power unit, and sensor modules with inductive power receivers that receive power from the inductive power unit.

In general, according to another aspect, the invention features a security camera system comprising a base unit and sensor modules with data transceivers for transmitting image data to the base unit.

In general, according to another aspect, the invention features a security camera system comprising a base unit with a plurality of magnetic mounting sockets to which sensor modules for capturing image data attach.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
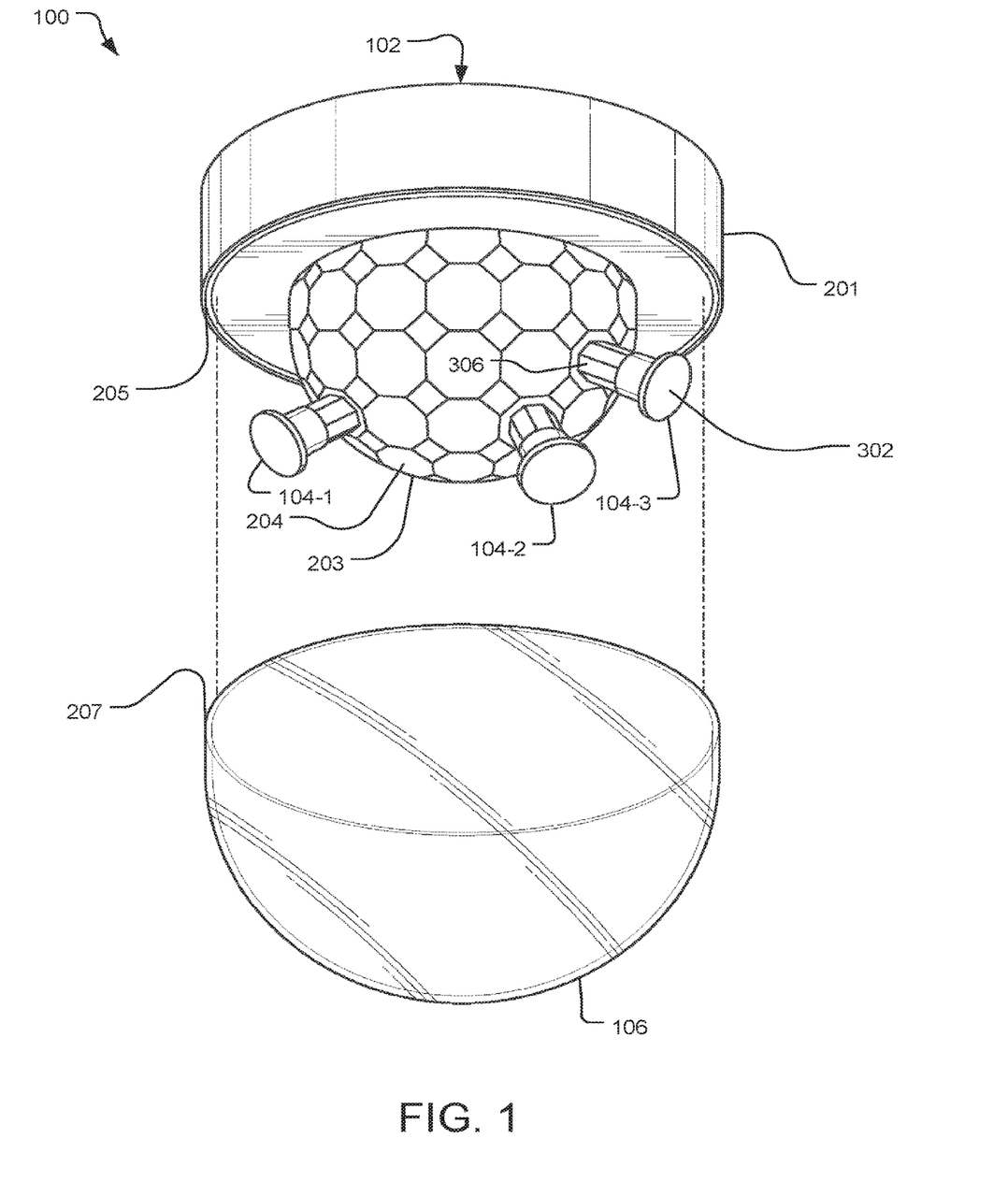
FIG. 1 is a perspective view of a security camera system according to the present invention.

FIG. 1 is a perspective view of a security camera system 100 according to the present invention.

The security camera system 100 includes a base unit 102, sensor modules 104 and a transparent bubble 106.

The base unit 102 includes a camera base 201 and a mounting dome 203. The camera base 201 is a cylindrical assembly, a top circular surface of which faces and attaches to a surface of a building or other structure on which the security camera system 100 is mounted, typically a ceiling or wall or mounting bracket. The mounting dome 203 is a dome, such as a hemispherical dome, protruding from a bottom circular surface of the camera base 201 to which the sensor modules 104 attach.

The mounting dome 203 includes several mounting sockets 204, which are identically-sized regions of the surface of the mounting dome 203 defined by raised ridges along the perimeters of the sockets and/or depressed regions within the interior of the sockets. The mounting sockets 204 are arrayed across the entire round surface of the mounting dome 203 such that the mounting sockets 204 face radially outward from a center of the hemispherical mounting dome 203 at regularly spaced intervals.

In the illustrated example, the mounting sockets 204 are octagons with square regions separating four of the eight sides of each mounting socket 204 from the sides of neighboring sockets. The front portion of the mounting dome 203 (visible in the illustration) includes about twenty mounting sockets 204, and the mounting dome 203 in its entirety (including portions of the mounting dome 203 not visible in the illustration) would have about forty mounting sockets 204 in total, as the mounting sockets 204 extend to cover the entire outer surface of the mounting dome 203.

In alternative embodiments, the mounting sockets 204 can be other shapes such as circles, hexagons or triangles, among other examples. The size and number of the mounting sockets 204 could also vary, based on the different embodiments. In general, there are at least 4 mounting sockets, but 10 or more is preferred.

In general, the mounting sockets 204 represent regions of the mounting dome 203 to which the sensor modules 104 can be attached.

The sensor module 104 includes a proximal end and a distal end. The distal end engages the exterior surface of the mounting dome 203. At the distal end of the sensor module is a mounting plug 306. The mounting plug 306 is prismatic shaped in the illustrated embodiment, with a distal exterior surface sharing the same shape as each of the mounting sockets 204 and engaging with the exterior surface of the mounting dome 203 within the perimeter of one of the mounting sockets 204.

In the illustrated example, the mounting plug 306 is an octagonal prism, matching the octagonal shape of the mounting sockets 204 depicted in the same illustration. However, in other embodiments in which the mounting sockets 204 take different shapes, the distal surface of the module mounting plug 306 would correspond to the shape of the mounting sockets 204.

At the proximal end of the sensor module 104 is a lens system 302, which is encased in a cylindrical assembly. In general, the sensor module 104 generates image data from light captured via the lens system 302.

The sensor modules 104 are attached to the mounting dome 203 such that their optical axis extend radially from the center of the mounting dome 203 in different elevational and azimuthal directions, corresponding to the positions of the different mounting sockets 204 along the surface of the dome. In general, the number of sensor modules 104 and the selection of mounting sockets 204 to which the modules attach determines a field of view of the security camera system 100.

The transparent bubble 106 is a hollow, rigid, hemisphere of transparent material. A circular rim 207 (forming the perimeter of a circular, flat face of the transparent bubble 106) inserts into an attachment ridge 205 along the perimeter of the bottom face of the camera base 201 and is secured via an attachment mechanism such as a snap fit.

The transparent bubble 106 is secured to the camera base 201 such that it encases the mounting dome 203 and attached sensor modules 104.

In the illustrated example, sensor modules 104-1, 104-2 and 104-3 are attached to the base unit 102, and the transparent bubble 106 is shown exploded off the security camera system 100.

Figure 2:
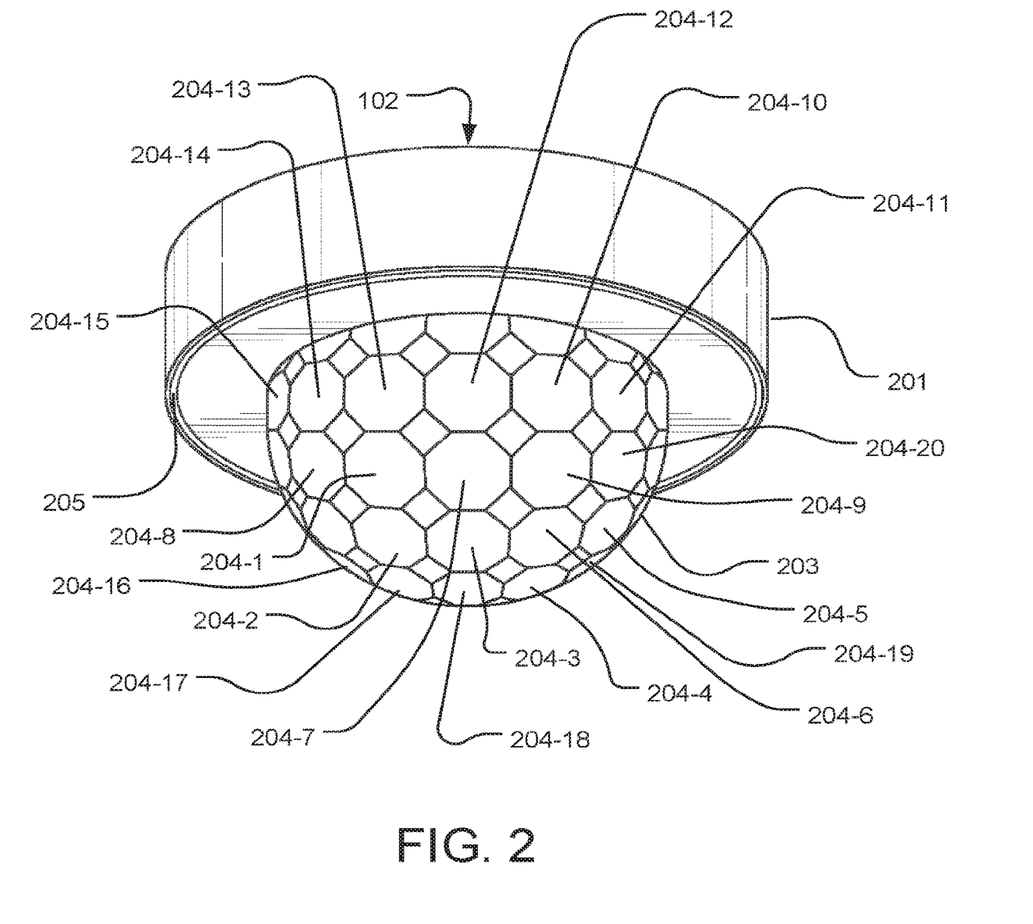
FIG. 2 is a perspective view of a base unit of the security camera system.

FIG. 2 is a perspective view of the base unit 102 of the security camera system 100 without any sensor modules 104 attached to it, depicting the camera base 201, mounting dome 203, mounting sockets 204 and attachment ridge 205. Here more of the mounting sockets have been labeled, specifically 204-1 to 204-20 to illustrate the number of potential locations at with the modular sensor modules 104 can be installed. A similar number of mounting sockets are available on the backside of the unit, but not shown in this view.

Figure 3:
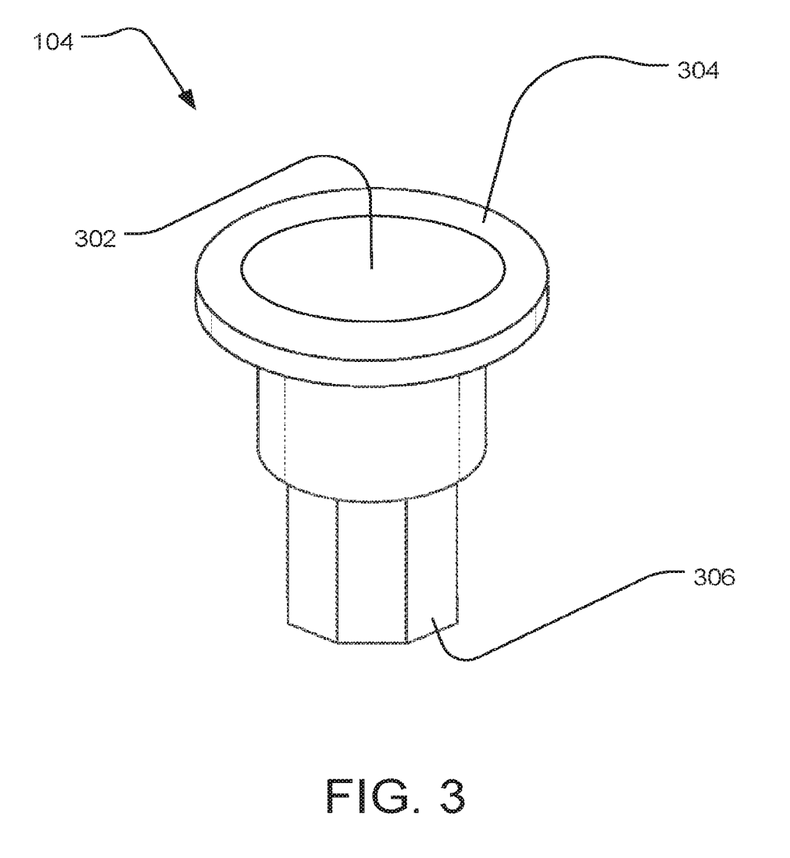
FIG. 3 is a perspective view of a sensor module of the security camera system.

FIG. 3 is a perspective view of the sensor module 104, depicting the lens system 302 and module mounting plug 306.

Also shown is a bubble contact ring 304, which is a ring of elastic material that compresses around the proximal end of the assembly containing the lens system 302 defining the module's entrance aperture. An interior surface of the transparent bubble 106 presses against the bubble contact ring 304 preventing movement and/or vibration of the sensor modules 104 and urging the sensor modules into their respective sockets.

Figure 4A:
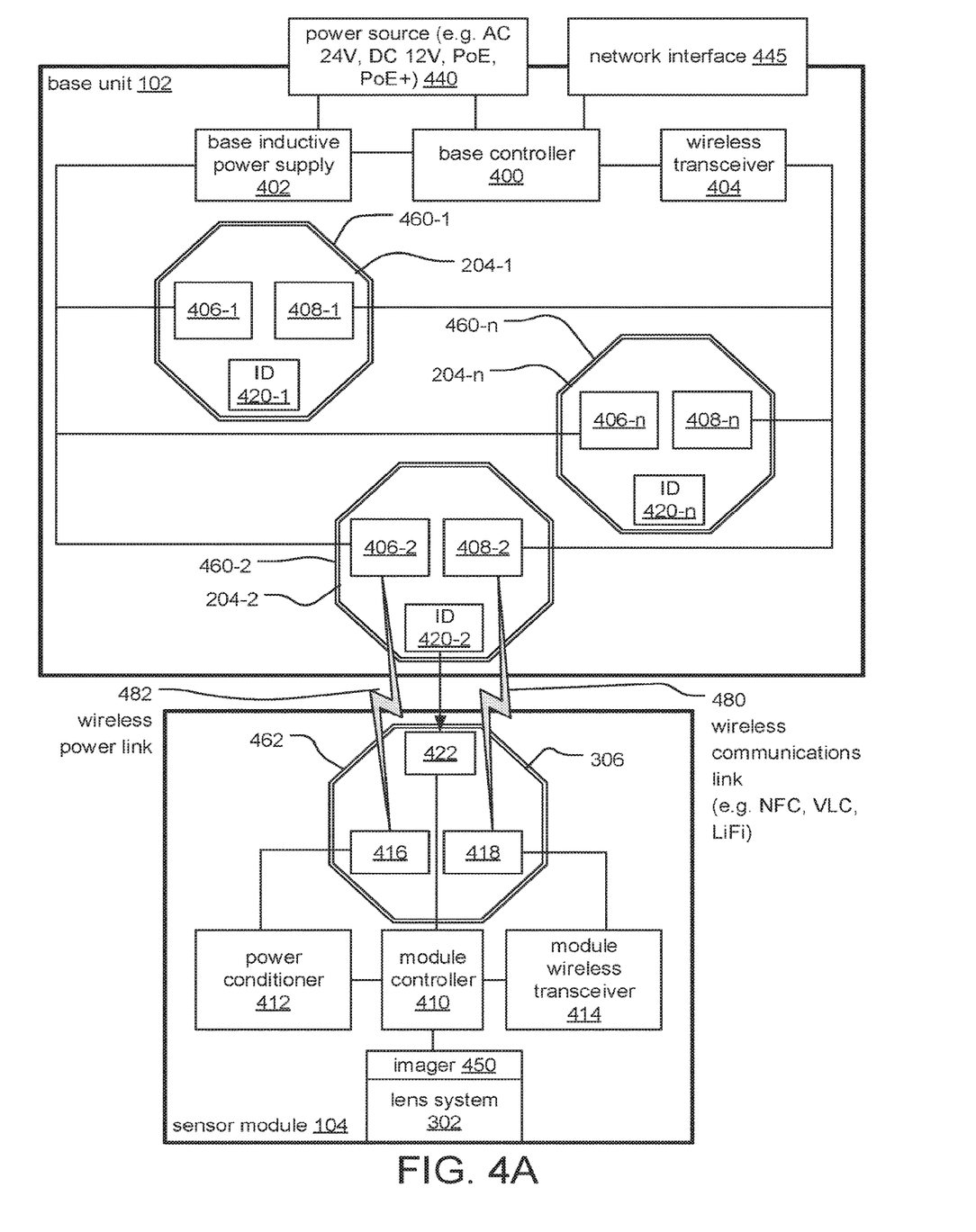
FIG. 4A is a schematic diagram of the base unit and the sensor module according to one embodiment of the present invention.

FIG. 4A is a schematic diagram of the base unit 102 and the sensor module 104 according to one embodiment of the current invention.

The base unit 102 includes a power source 440, a base inductive power supply 402, a base controller 400, a wireless transceiver 404, a network interface 445, and several mounting sockets 204. In the figure, only 3 mounting sockets are shown, but in the typical embodiment, the number of mounting sockets 204 would be at least 4, but typically 10 or more are provided. Each mounting socket includes a socket magnetic mount 460, an inductive power transmitter 406, a wireless antenna 408, and a socket identification (ID) 420.

The sensor module 104 includes a module controller 410, a power conditioner 412, a module wireless transceiver 414, a lens system 302 and imager 450, and a module mounting plug 306, which includes a module magnetic mount 462, an inductive power receiver 416, a wireless antenna 418 and an ID reader module 422.

In general, the sensor module 104 generates image data. Incoming light is collected and focused by the lens system 302 on an imager 450, such as a CCD or CMOS imager. The image data is sent the base unit 102. The base unit 102 receives image data from one or more sensor modules 104 and associates the image data from each sensor module 104 with elevation and azimuth information associated with the mounting socket 204 to which the sensor module 104 is attached.

The power source 440 provides power to the components of the base unit 102 including the base controller 400 and the base inductive power supply 402. In different examples, the power source can be a battery, an AC 24V power supply, a DC 12V power supply, or a power supply utilizing Power over Ethernet (PoE) or PoE+ technologies.

The base controller 400 executes firmware instructions and, in general, sends instructions to and receives data from the base inductive power supply 402, sensor modules 104 via the wireless transceiver 404 and wireless antenna(s) 408, and the network interface 445. More specifically, the base controller 400 receives image data from the sensor modules 104 and sends it to a network video distribution system 702 via the network interface 445.

In the illustrated embodiment, the base unit 102 wirelessly provides power to the sensor modules 104 via the base inductive power supply 402, inductive power transmitters 406, inductive power receivers 416, and the power conditioner 412. When the sensor module 104 is attached to the mounting socket 204-2, the inductive power transmitter 406-2 at or near the surface of the mounting dome 203 in the region containing the mounting socket 204-2 come into proximity with the inductive power receiver 416 of the sensor module 104. The base inductive power supply 402 supplies an alternating current to the inductive power transmitter 406, which is, for example, a coil. An oscillating magnetic field is formed, which induces an alternating current in the inductive power receiver 416, as illustrated as a wireless power link 482. This alternating current is then conditioned by the power conditioner 412, for example, by converting it to direct current to power the sensor module 104.

The module controller 410 receives power from the power conditioner 412 and image data from the imager 450 (based on light captured by the lens system 302). The module controller 410 also sends instructions to and receives ID information (for the mounting socket 204 to which the sensor module 104 is attached) to and from the ID reader module 422. The module controller 410 sends the image data and the ID information to the base unit 102 via the wireless transceiver 414.

The base wireless transceiver 404 and the module wireless transceiver 414 wirelessly (e.g. via near-field communication, visible light communication or LiFi technologies) send and receive information to each other via a wireless communications link 480 between the base wireless antenna 408 and the module wireless antenna 418, respectively.

The socket ID 420 is a unique identifier associated with each mounting socket 204, which is detected by the ID reader module 422.

The sensor modules 104 attach to the mounting sockets 204 via the socket magnetic mount 460 and the module magnetic mount 462. In one example, the magnetic mounts 460, 462 are formed of ferromagnetic material and/or magnets that are attracted to each other.

In the illustrated example, three mounting sockets 204-1, 204-2, 204-$n$ are depicted, and the sensor module 104 is attached to mounting socket 204-2. The sensor module 104 would be attached to the mounting socket 204-2 in such a way to allow the inductive transmitter 406-2, wireless transceiver 408-2 and socket ID 420-2 of the mounting socket 204-2 to interface with the inductive power receiver 416, wireless transceiver 418 and ID reader module 422 of the sensor module 106. In different examples, this may involve the components of the mounting socket 204 to come in direct contact with their counterparts on the sensor module 104, or to simply come in close proximity.

Figure 4B:
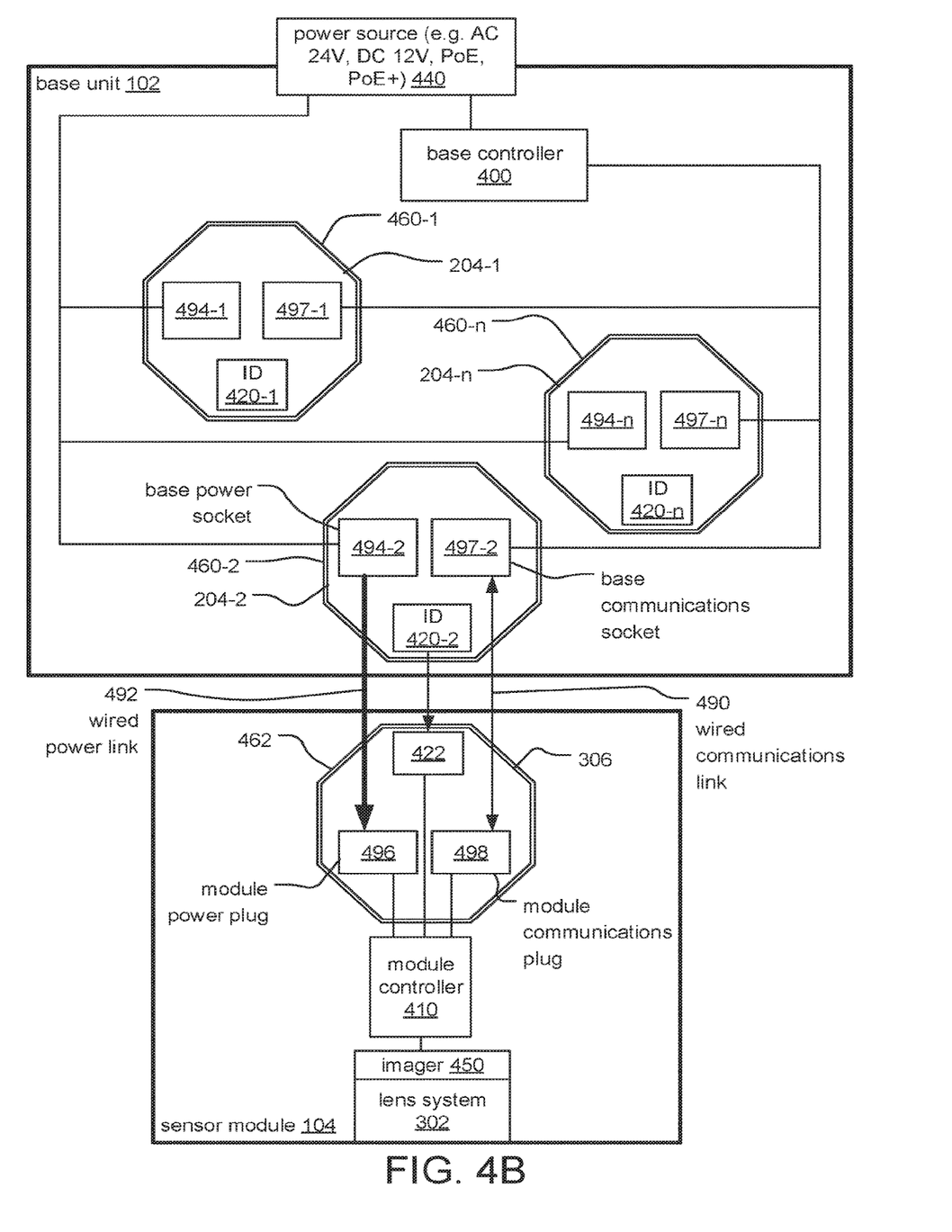
FIG. 4B is a schematic diagram of the base unit and the sensor module according to an alternative embodiment of the present invention.

FIG. 4B is a schematic diagram of the base unit 102 and the sensor module 104 according to an alternative embodiment of the current invention.

In the illustrated example, the sensor module 104 communicates with and is powered by the base unit 102 via a wired connections as opposed to wireless communication and inductive power. Here, instead of using inductive power transmitters and receivers and wireless antennas, power is supplied to the sensor module 104 via a wired power link 492, and the modules 104 communicate with the base unit 102 via a wired communications link 490. More specifically, when the sensor module 104 is attached to the mounting socket 204, a module power plug 496 of the sensor module 104 comes in contact with, or is inserted into, a base power socket 494. Similarly, a module communications plug 498 comes in contact with, or is inserted into, a base communications socket 497.

In this embodiment, the base unit no longer includes the base inductive power supply 402 or the wireless transceiver 404, and the sensor module 104 no longer includes the power conditioner 412 or the module wireless transceiver 414.

Figure 5A:
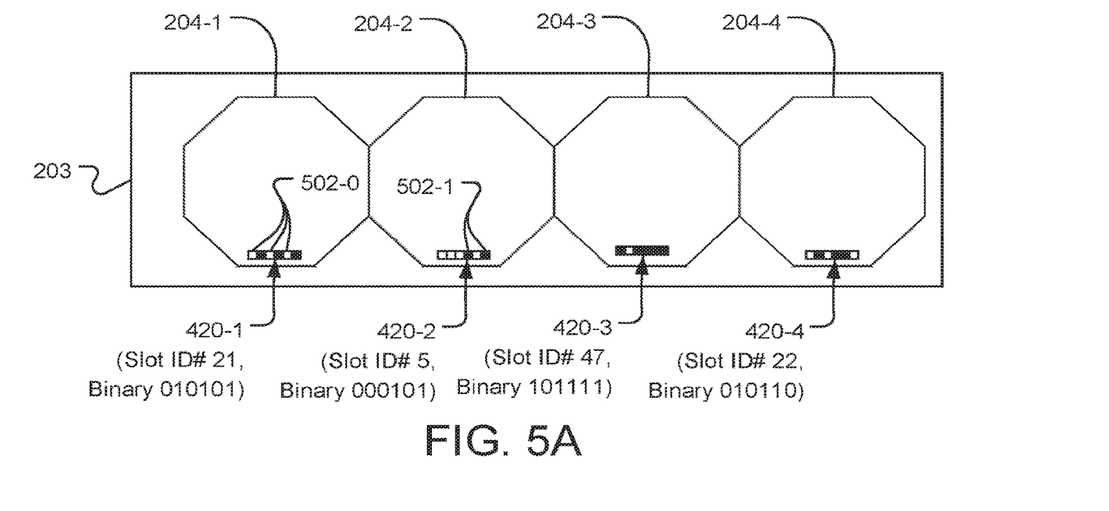
FIG. 5A is a top view illustration of a socket ID for four exemplary mounting sockets.

FIG. 5A is a top view illustration of the socket ID 420 for four exemplary mounting sockets 204.

In the preferred embodiment, the socket ID 420 is a six-digit binary number physically engraved on the surface of the mounting dome 203 in each region of the surface of the mounting dome 203 containing mounting sockets 204. The binary number is engraved on the surface of the mounting dome 203 in the form of ID digit regions 502. Digits of value 1 are represented as raised regions 502-1 on the surface of the mounting dome 203, and digits of value 0 are represented as depressed or flat (not raised) regions 502-0 of the surface of the mounting dome 203.

In the illustrated example, mounting socket 204-1 has a socket ID 420-1 representing "010101" (21). The socket ID 420-1 comprises three raised regions 502-1 and three depressed regions 502-0 in an order corresponding to the binary number 010101. Mounting socket 204-2 has a socket ID 420-2 representing "000101" (5). The socket ID 420-2 comprises two raised regions 502-1 and four depressed regions 502-0 in an order corresponding to the binary number 000101. Mounting socket 204-3 has a socket ID 420-3 representing "101111" (47). The socket ID 420-3 comprises five raised regions 502-1 and one depressed region 502-0 in an order corresponding to the binary number 101111. Finally, Mounting socket 204-4 has a socket ID 420-4 representing "010110" (22). The socket ID 420-4 comprises three raised regions 502-1 and three depressed regions 502-0 in an order corresponding to the binary number 010110.

The socket ID 420 of each mounting socket 204 is positioned along the bottom edge of each mounting socket 204.

Figure 5B:
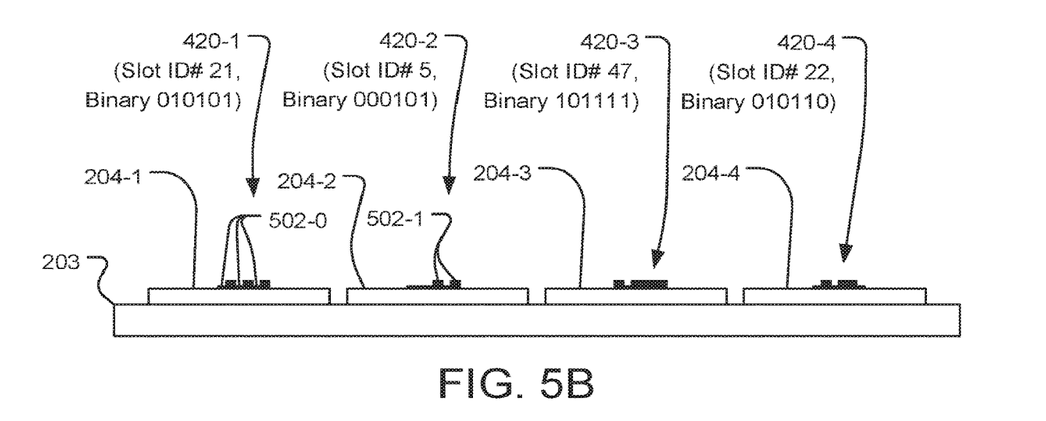
FIG. 5B is a side view illustration of the socket ID for the same four exemplary mounting sockets illustrated in FIG. 5A.

FIG. 5B is a side view illustration of the socket ID 420 for the same four exemplary mounting sockets 204.

Figure 6:
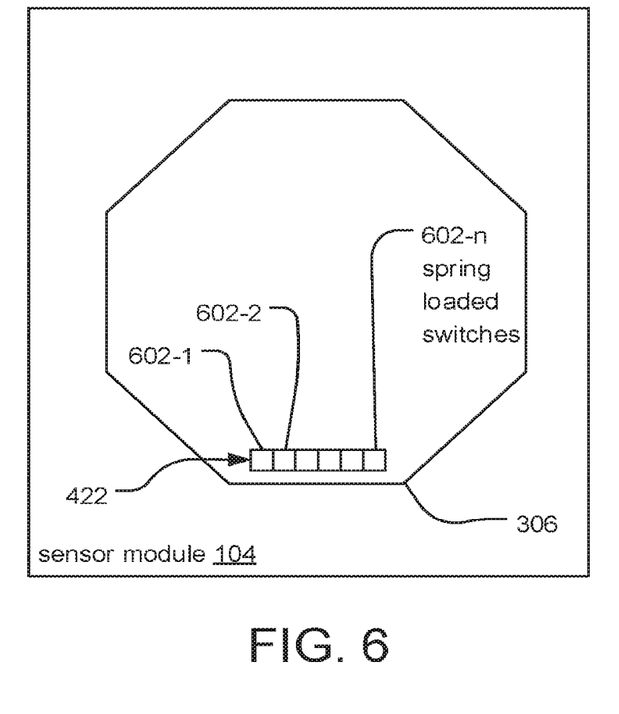
FIG. 6 is a block diagram of an embodiment of the ID reader module.

FIG. 6 is a block diagram of an embodiment of the ID reader module 422. In the illustrated embodiment, the ID reader module 422 comprises six spring loaded switches 602 on the bottom surface of the mounting plug 306 of the sensor module 104. Each of the six spring loaded switches 602 corresponds to the six ID digit regions 502 of the socket ID 420. When the sensor module 104 is attached to the mounting socket 204, the ID digit regions 502 contact the spring loaded switches 602. The raised regions 502-1 cause the spring loaded switches 602 to compress, while the depressed regions 502-0 do not. The compressed spring loaded switches 602 would represent a digit with the value of 1 in the socket II) 420, and the non-compressed spring loaded switches 602 would represent a digit with the value of 0. In this way, the ID reader module 422 detects the socket ID 420 of the mounting socket 204 to which the sensor module 104 is attached.

Figure 7:
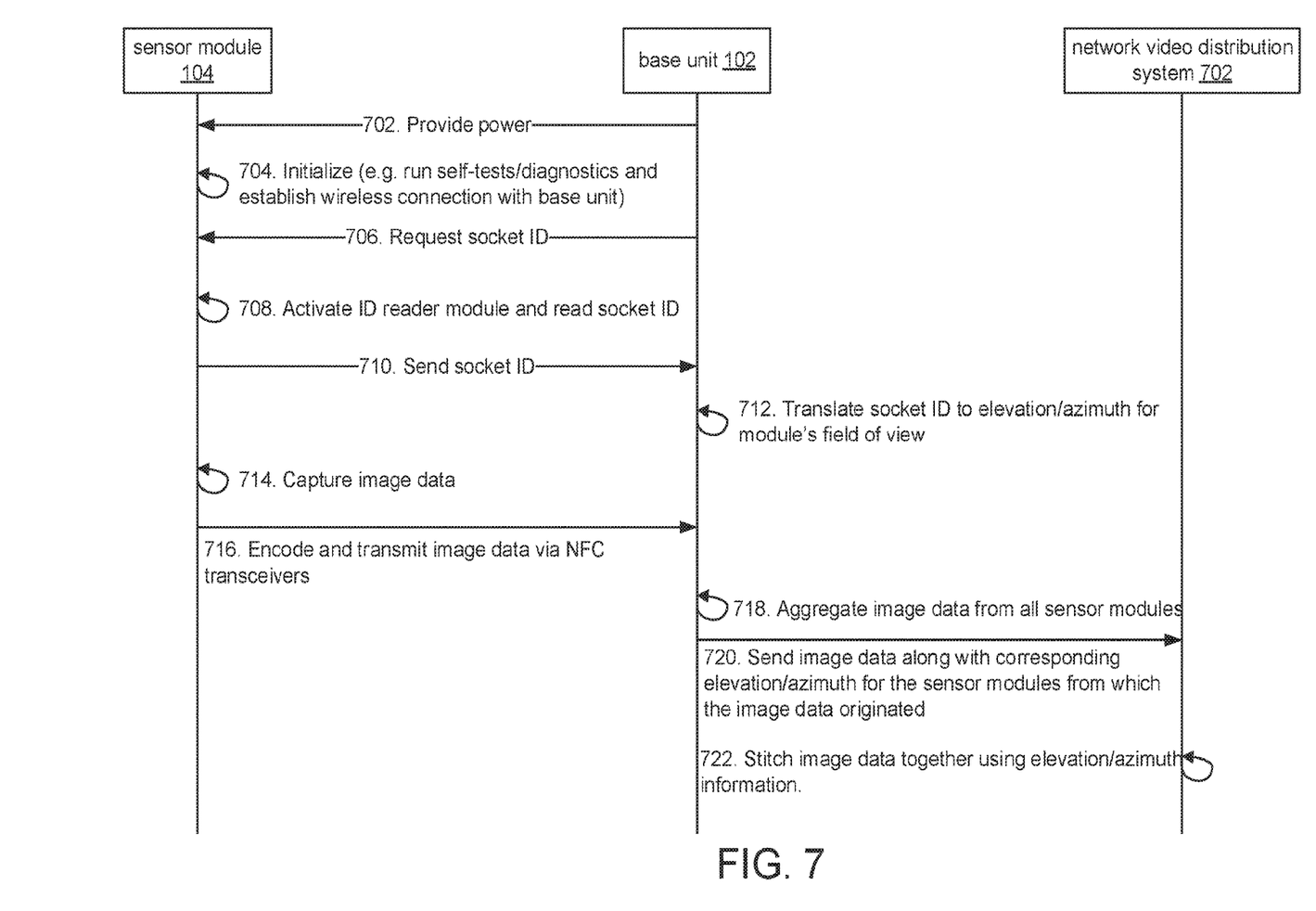
FIG. 7 is a sequence diagram illustrating the process by which the image data generated by the sensor modules is combined.

FIG. 7 is a sequence diagram illustrating the process by which the image data generated by the sensor modules 104 is combined, or stitched together.

In step 702, the base unit 102 provides power to the sensor module 104. This can be done inductively as previously described or via a wired connection.

In step 704, the sensor module 104 initializes itself in response to receiving power from the sensor module 104. In one example, the sensor module 104 runs self-tests/diagnostic procedures and establishes wireless communications with the base unit 102.

In step 706, the base unit 102 requests the socket ID 420 of the mounting socket 204 to which the sensor module 104 is attached. The sensor module 708 activates the ID reader module 422 and reads the socket ID 420. In step 710, the socket ID 420 is sent to the base unit 102.

In step 712, the base unit 102 translates the socket ID 420 received from the sensor module 104 into elevation/azimuth information for the sensor module's 104 field of view.

In step 714, the sensor module 104 captures image data, which is then encoded and transmitted to the base unit 102 in step 716.

In step 718, the base unit 102 aggregates the image data from all of the sensor modules 104. In step 720, the image data, along with the corresponding elevation/azimuth information, is sent to a network video distribution system 702.

Finally, in step 722, the network video distribution system 702 uses the elevation/azimuth information pertaining to each of the sensor modules 104 to stitch together the image data.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera system, comprising:
   a base unit including a mounting dome and at least one mounting socket, wherein the at least one mounting socket is arranged on the mounting dome and the mounting socket comprises an inductive power transmitter; and
   at least one sensor module for attaching to the at least one mounting socket and for capturing image data, and the at least one sensor module comprises an inductive power receiver for receiving power from the inductive power transmitter of the at least one mounting socket to which the at least one sensor module is attached, and a reader module configured to read an identifier associated with the mounting socket,
   wherein the at least one sensor module further comprises reader modules for detecting socket identifications engraved on the at least one mounting sockets to which the at least one sensor module are attached, and a controller of the base unit translates the socket identifications to elevation and azimuth information associated with the at least one mounting socket to which the at least one sensor module is attached.

2. The security camera system of claim 1, wherein the at least one mounting socket is arranged on a surface of the mounting dome, which is hemispherical.

3. The security camera system of claim 2, wherein the at least one mounting socket faces radially outward from a center of the mounting dome.

4. The security camera system of claim 2, wherein the at least one sensor module is attached to the mounting dome such that an optical axis extends radially from a center of the mounting dome in an elevational and azimuthal direction corresponding to a position of the at least one mounting socket.

5. The security camera system of claim 4, wherein the at least one mounting socket is a region of the surface of the mounting dome defined by a raised ridge along a perimeter of the at least one mounting socket and/or a depressed region within the perimeter of the at least one mounting socket.

6. The security camera system of claim 5, wherein the at least one sensor module is attached to the mounting dome such that a distal exterior surface of the at least one sensor module engages with an exterior surface of the mounting dome within the perimeter of the at least one mounting socket.

7. The security camera system of claim 6, wherein the distal exterior surface of the at least one sensor module is a same shape as the at least one mounting socket.

8. The security camera system of claim 1, wherein when the at least one sensor module is attached to the mounting socket, the inductive power transmitter for the at least one mounting socket to which the at least one sensor module is attached comes into proximity with the inductive power receiver of the at least one sensor module.

9. The security camera system of claim 1, wherein the at least one mounting socket includes a socket magnetic mount, and the at least one sensor module includes a module magnetic mount, and the at least one sensor module attaches to the at least one mounting socket via the socket magnetic mount and the module magnetic mount, which attract each other.

10. The security camera system of claim 1, wherein the identifier is used to stitch the image data.

11. The security camera system of claim 10, wherein the base unit translates the identifier to elevation and azimuth information for a field of view of the at least one sensor module, and which the elevation and azimuth information for a field of view is used to stitch the image data.

12. The security camera system of claim 10, wherein the at least one sensor module sends the identifier to the base unit to be used to stitch the image data.

13. The security camera system of claim 1, further comprising a protective transparent bubble secured over the at least one sensor module and the base unit, wherein an interior surface of the transparent bubble pressing against an elastic contact ring of the at least one sensor module prevents movement of the at least one sensor module.

14. The security camera system of claim 1, wherein the identifier is a unique socket identification physically engraved on a surface of the at least one mounting socket.

15. The security camera system of claim 14, wherein a controller of the base unit translates the socket identification to elevation and azimuth information associated with the at least one mounting socket to which the at least one sensor module is attached.

16. The security camera system of claim 15, further comprising a network video distribution system for receiving the image data captured by the at least one sensor module and the elevation and azimuth information, and stitching the image data using the elevation and azimuth information.

17. A security camera device, comprising:
   a base unit including a mounting dome and at least one mounting socket that includes a socket magnetic mount and an inductive power transmitter; and
   a sensor module for attaching to the at least one mounting socket and for capturing image data, wherein the sensor module includes a module magnetic mount for attaching to the socket magnetic mount and an inductive power receiver for receiving power from the inductive power transmitter of the at least one mounting socket to which the sensor module is attached, wherein the at least one mounting socket is associated with an identifier, and the identifier for the at least one mounting socket is used to stitch the image data captured by the at least one sensor module based on unique socket identifications physically engraved on a surface of the at least one mounting socket,
   wherein the sensor module further comprises reader modules for detecting the socket identifications engraved on the at least one mounting sockets to which the at least one sensor module are attached, and a controller of the base unit translates the socket identifications to elevation and azimuth information associated with the at least one mounting socket to which the sensor module is attached.

18. The security camera device of claim 17, further comprising a protective transparent bubble secured over the at least one sensor module and base unit, wherein an interior surface of the transparent bubble pressing against elastic contact rings of the at least one sensor module prevents movement of the at least one sensor module.

* * * * *